(12) United States Patent
Lem et al.

(10) Patent No.: US 9,925,894 B2
(45) Date of Patent: Mar. 27, 2018

(54) APPARATUS AND METHOD FOR A VEHICLE MASSAGE FUNCTION FOR A VEHICLE SEAT

(71) Applicant: Ford Global Technologies, LLC, Dearborn, MI (US)

(72) Inventors: Jeroen Lem, Maastricht (NL); Brian Boland, Pinckney, MI (US); Amber LaVerne Hall, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 15/208,016

(22) Filed: Jul. 12, 2016

(65) Prior Publication Data
US 2018/0015853 A1    Jan. 18, 2018

(51) Int. Cl.
*G06F 19/00*    (2011.01)
*B60N 2/44*    (2006.01)
*B60N 2/02*    (2006.01)
*A61H 15/00*    (2006.01)

(52) U.S. Cl.
CPC ......... *B60N 2/448* (2013.01); *A61H 15/0078* (2013.01); *B60N 2/0244* (2013.01); *B60N 2/0248* (2013.01); *A61H 2201/0149* (2013.01); *A61H 2201/501* (2013.01); *A61H 2201/5002* (2013.01); *A61H 2201/5046* (2013.01)

(58) Field of Classification Search
CPC .... B60N 2/448; B60N 2/0244; B60N 2/0248; A61H 15/0078; A61H 2201/0149; A61H 2201/5002; A61H 2201/501; A61H 2201/504

USPC .......................................................... 701/36
See application file for complete search history.

(56) References Cited

U.S. PATENT DOCUMENTS

| 6,053,880 | A | 4/2000 | Sleichter, III |
| 7,311,681 | B1 | 12/2007 | Vaccarella |
| 7,931,334 | B1 | 4/2011 | Caruso |
| 9,095,215 | B1 | 8/2015 | Caruso |
| 2009/0287093 | A1* | 11/2009 | Ferren ................. A61B 5/412 600/481 |
| 2010/0036268 | A1* | 2/2010 | Ferren ................. G06F 19/3406 600/504 |
| 2010/0036269 | A1* | 2/2010 | Ferren ................. A61B 5/02007 600/504 |
| 2014/0207333 | A1 | 7/2014 | Vandivier et al. |
| 2015/0277754 | A1 | 10/2015 | Misch et al. |
| 2016/0008206 | A1* | 1/2016 | Devanaboyina ....... A47C 9/002 601/136 |

(Continued)

FOREIGN PATENT DOCUMENTS

| DE | 102013012768 | 3/2014 |
| WO | 2014023644 | 2/2014 |

*Primary Examiner* — Ronnie M Mancho
(74) *Attorney, Agent, or Firm* — Vichit Chea; Price Heneveld LLP (57) ABSTRACT

A method for customizing a vehicular massage function includes providing massage element indicia, creating massage subroutines using the massage element indicia, selecting a vehicle that includes a seat having a massage element configuration, placing the massage subroutines in communication with the vehicle, adapting the massage subroutines to be compatible with the massage element configuration and activating the seat to perform at least one massage subroutine.

20 Claims, 10 Drawing Sheets

(56) References Cited

U.S. PATENT DOCUMENTS

2016/0354027 A1* 12/2016 Benson ................. A61M 21/02
2017/0182517 A9* 6/2017 Houston ................. B06B 1/166

* cited by examiner

APPARATUS AND METHOD FOR A VEHICLE MASSAGE FUNCTION FOR A VEHICLE SEAT

FIELD OF THE INVENTION

The present invention generally relates to vehicle seating, and more specifically, vehicle seating having various massage functions incorporated therein.

BACKGROUND OF THE INVENTION

Within various automobiles, seating within the passenger cabin can include various massage elements that can be activated and deactivated, based upon the needs of the user. These massage elements can provide various massage functionality to the user during occupancy of the vehicle.

SUMMARY OF THE INVENTION

According to one aspect of the present invention, a method for operating a massage function of a vehicle includes providing a user interface having a plurality of massage element indicia and creating a plurality of massage subroutines by selecting patterns of massage element indicia from the plurality of massage element indicia. Selection of each massage element indicia corresponds to a massage instruction for a specific massage subroutine. The plurality of massage subroutines are stored in a portable memory in communication with the user interface. The method also includes selecting a vehicle to be occupied, wherein the vehicle to be occupied includes a seat having a plurality of massage elements placed in a massage element configuration. The portable memory is placed in communication with the vehicle to be occupied wherein the plurality of massage subroutines are in selective communication with the plurality of massage elements. A pattern of massage subroutines of the plurality of massage subroutines are selected to be performed. The pattern of massage subroutines are adapted to be compatible with the massage element configuration, wherein each massage instruction of each specific massage subroutine is placed in correspondence with at least one massage element of the plurality of massage elements. The plurality of massage elements is then activated to perform the pattern of massage subroutines.

According to another aspect of the present invention, a method for operating a massage function of a vehicle includes engaging a user interface having a plurality of massage element indicia and selecting patterns of massage element indicia from the plurality of massage element indicia to define a plurality of massage subroutines. Each pattern of massage element indicia corresponds to a specific massage subroutine. The plurality of massage subroutines are stored in a portable memory in communication with the user interface. A vehicle to be occupied is selected, wherein the vehicle to be occupied includes a seat having a plurality of massage elements. The method also includes placing the portable memory in communication with the vehicle to be occupied such that each massage element indicia of the plurality of massage element indicia corresponds to a massage element of the plurality of massage elements selecting a pattern of massage subroutines of the plurality of subroutines to be performed by the plurality of massage elements and activating the plurality of massage elements to perform the pattern of massage subroutines.

According to another aspect of the present invention, a method for customizing a vehicular massage function includes providing massage element indicia, creating massage subroutines using the massage element indicia, selecting a vehicle that includes a seat having a massage element configuration, placing the massage subroutines in communication with the vehicle, adapting the massage subroutines to be compatible with the massage element configuration and activating the seat to perform at least one massage subroutine.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
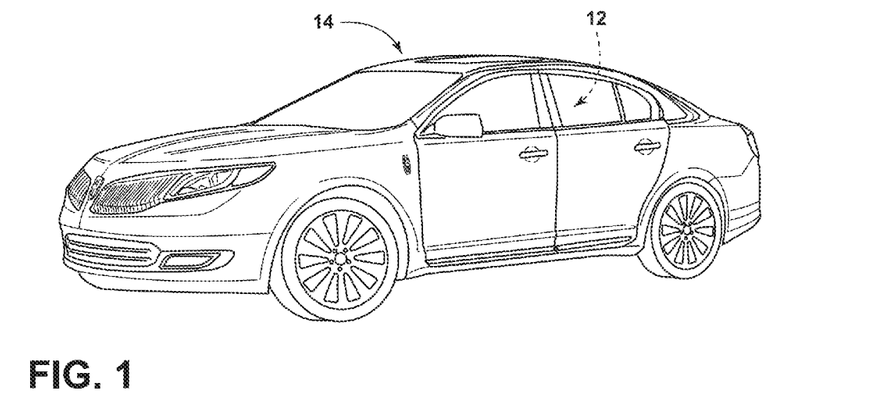
FIG. 1 is a side perspective view of a vehicle incorporating a plurality of massage elements within one or more seating positions within the passenger cabin.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
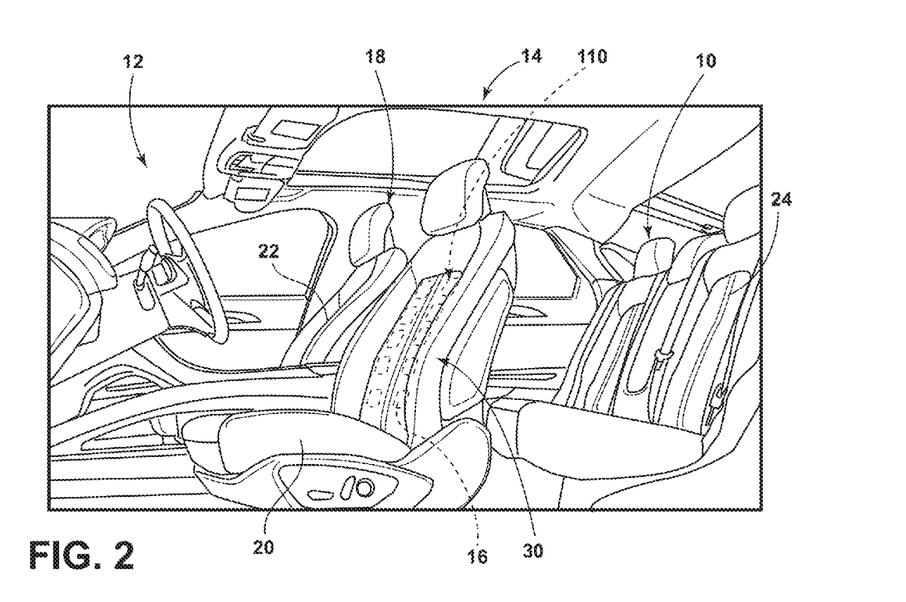
FIG. 2 is an interior perspective view of the vehicle of FIG. 1.
Figure 3:
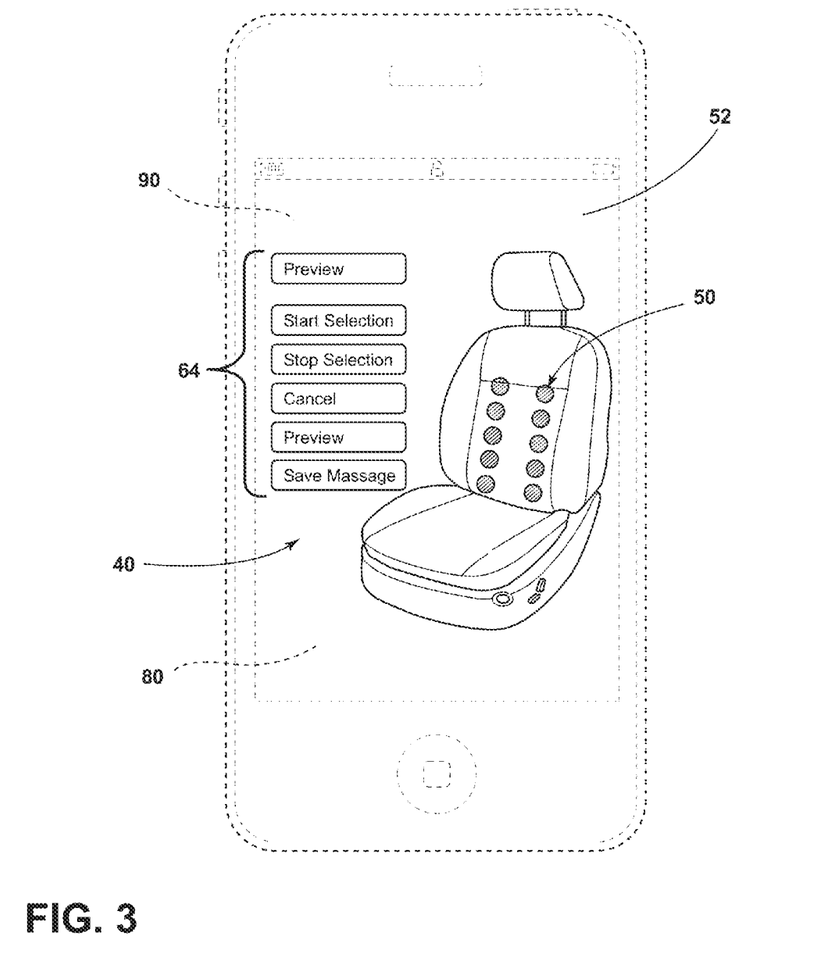
FIG. 3 is an elevational view of a user interface for operating a massage function of the vehicle seat.
Figure 4:
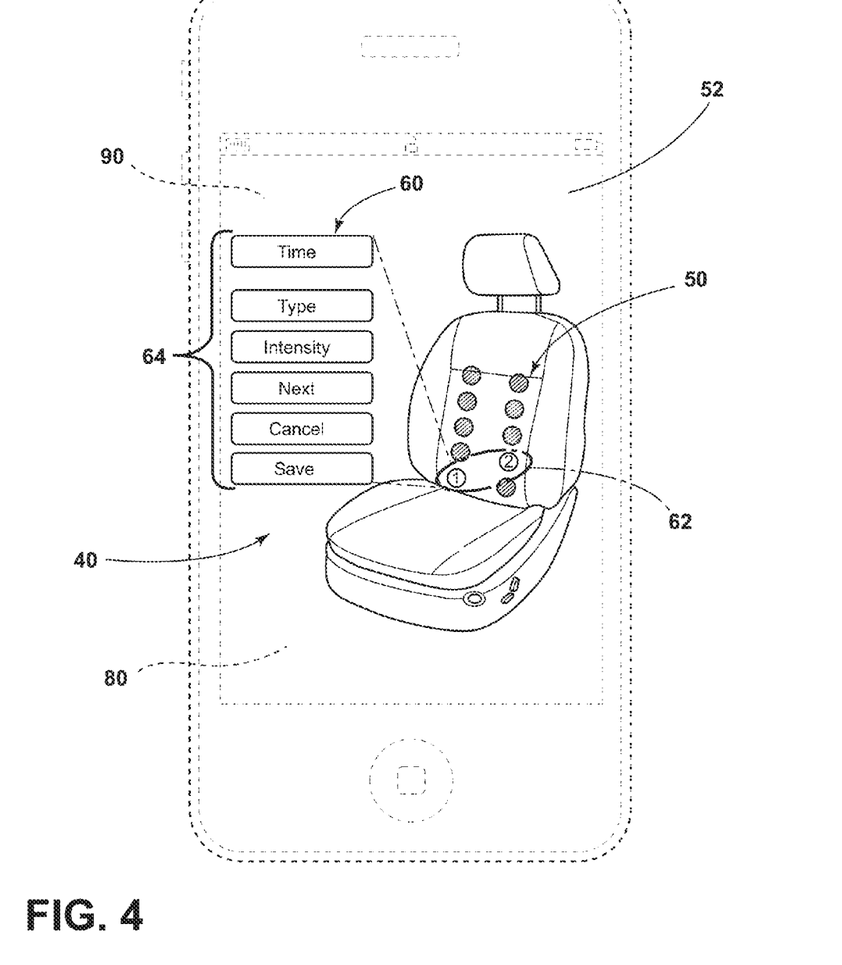
FIG. 4 is an alternate elevational view of the user interface of FIG. 3.
Figure 5:
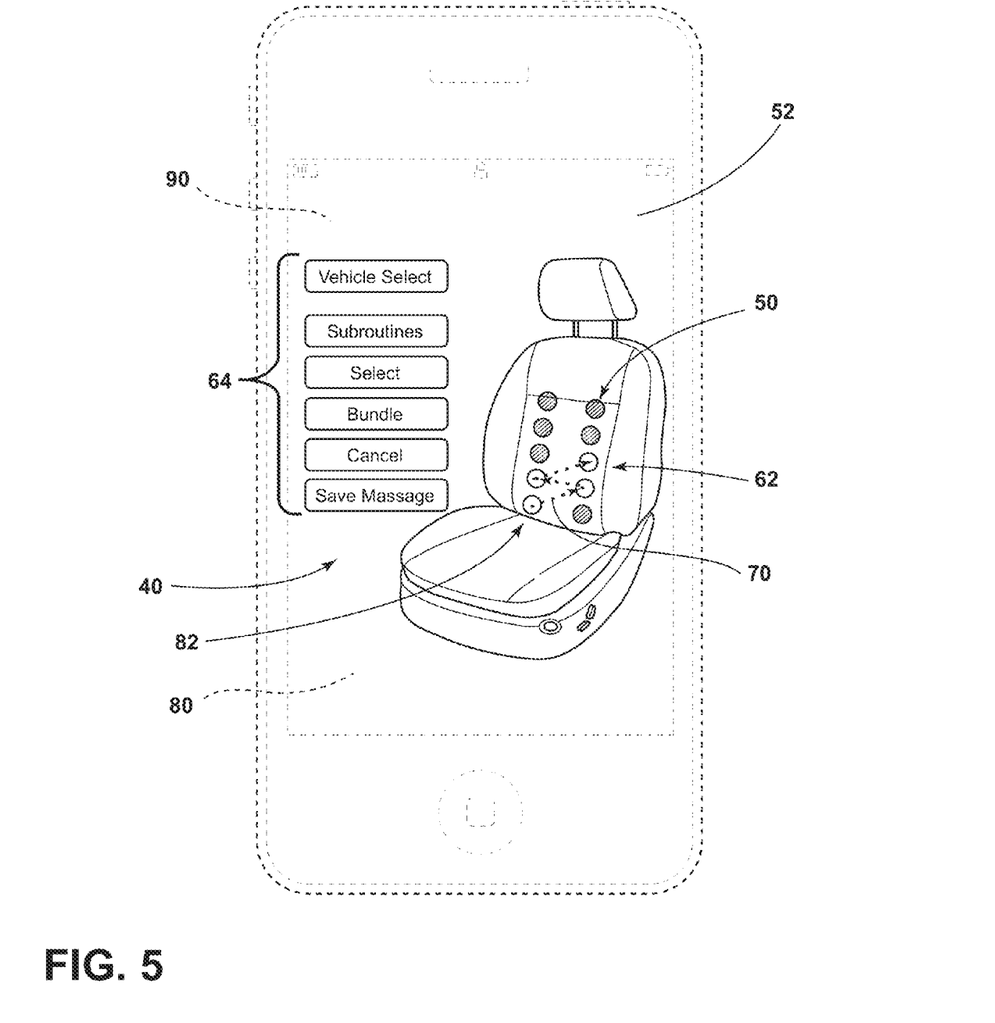
FIG. 5 is an alternate elevational view of the user interface of FIG. 3.

As shown in FIGS. 1-3, reference numeral 10 generally refers to a vehicle seat disposed within a passenger cabin 12 of the vehicle 14. According to various embodiments, the vehicle seat 10 can include a plurality of massage elements 16 that provide various massage functions to the occupant of a particular vehicle seat 10. It is contemplated that the vehicle seat 10 disclosed herein can be any one of a plurality of vehicle seats 10 disposed within the passenger cabin 12 of the vehicle 14 where each vehicle seat 10 can correspond to a particular seating position 18 within the passenger cabin 12. By way of example, and not limitation, the vehicle seat 10 including the massage elements 16 can be the driver's seat 20, the front passenger seat 22, any one of the rear seating positions 24, third row seating positions, and other various seating positions 18 within any one of various vehicles 14.

Referring again to FIGS. 1-3 and 7-9, the various massage elements 16 within the vehicle seat 10 can be disposed in various massage element configurations 30 depending upon the particular vehicle 14 being occupied, the seating position 18 within the passenger cabin 12, and other similar design considerations within the vehicle 14. It is also contemplated that the various massage elements 16 can also be operable within the vehicle seat 10 to accommodate occupants of varying sizes by adjusting the massage element configuration 30.

According to the various embodiments, as exemplified in FIGS. 3-7, the device disclosed herein includes a user interface 40 for operating a massage function for a vehicle seat 10 to be occupied. In particular, the vehicle seat 10 to be occupied may be any one of several vehicles 14, such as those within a set of fleet of vehicles 14 owned by a particular company or other entity. Such fleet vehicles 14 can include rental cars, taxi services, a fleet of company owned cars, a plurality of cars owned by a single family or used by a particular group of people, combinations thereof and other similar fleet-type vehicles 14 that may be used by numerous individuals. It is also contemplated that the vehicle seat 10 disclosed herein that is operated by the control for operating various massage functions can include vehicles 14 operated under various ride-share programs. Such ride share programs can include, but are not limited to Uber®, Lyft®, Carma, BlaBlaCar, and other similar ride-sharing services. In each of these instances, a fleet vehicle or ride-share vehicle may be temporarily occupied by a particular individual who may or may not occupy that vehicle 14 at any time in the future. When a particular fleet vehicle or ride share vehicle includes a massage function, the device disclosed herein provides a mode operation that allows a particular occupant of the vehicle 14 to customize the massage function of the vehicle seat 10 and/or seating position 18 to be occupied regardless of the massage element configuration 30.

Referring now to FIGS. 1-5 and 10, a method 400 is disclosed for operation of this device for controlling a massage function for a vehicle seat 10 (step 402). This method 400 includes manipulating a user interface 40 that includes a plurality of massage element indicia 50. The user interface 40 can include a touchscreen 52, such as that used for a smart phone, tablet, other portable computing device, laptop, computer, or other similar user interface 40. Through manipulation of the user interface 40, the user can engage the plurality of massage element indicia 50. It is contemplated that the massage element indicia 50 within the user interface 40 generally corresponds to an exemplary vehicle seat 10 that may or may not match the positions of the various massage elements 16 within a vehicle seat 10 or the massage element configuration 30 to be occupied. It is also contemplated that the user interface 40 can be a touch screen or other control incorporated within the vehicle 14. Such control within the vehicle 14 may be located proximate any of the seating positions 18 within the passenger cabin 12.

Referring to FIGS. 3-6 and 10, a user can engage the user interface 40 by touching one or more of the massage element indicia 50 to define various massage instructions 60 for defining the type of massage the user may want to receive during occupancy of the vehicle seat 10 to be occupied. In this manner, the user can create various massage subroutines 62 by selecting individual massage element indicia 50 or by selecting patterns of massage element indicia 50 from the plurality of massage element indicia 50 disposed within the user interface 40 (step 404). It is contemplated that selection of each massage element indicia 50 corresponds to one or more massage instruction 60 for a specific massage subroutine 62. Accordingly, when the user engages a particular massage element indicia 50, the user can engage and select various selection functions to define the type of massage to be provided within that massage subroutine 62. By way of example, and not limitation, a user can engage a particular massage element indicia 50 to open an operational menu 64 to select various massage instructions 60 that can include, but are not limited to, massage length, massage intensity, massage pattern, idle time, various heating or cooling functions used in conjunction with the massage function of the vehicle seat 10, massage style, massage element 16 movements within the vehicle seat 10, combinations thereof and other similar massage instructions 60 that can be implemented by components of the vehicle seat 10. The components of the vehicle seat 10 that can perform the various massage instructions 60 can include, but are not limited to, air bladders, heating elements, cooling elements, massage elements 16, cushions, motors, combinations thereof and other similar components. Additionally, as exemplified in FIG. 5, the various massage subroutines 62 can be selected through a sliding motion 70 across the user interface 40 to link two or more massage element indicia 50. This linking of massage element indicia 50 can provide a directional element of the massage subroutine 62 as well as providing a massage element 16 hierarchy or order to be performed during occupancy of the particular vehicle seat 10 to be occupied.

According to the various embodiments, it is contemplated that a user can create the various massage subroutines 62 while in the vehicle 14, while in a different vehicle 14, or while outside of the vehicle 14 entirely. Accordingly, it is contemplated that the various massage subroutines 62 can be stored within a portable memory 80 that is in communication with the user interface 40 (step 406). It is further contemplated that the portable memory 80 can be the internal memory of the particular portable device or other computing device that includes or is able to access the user interface 40. The portable memory 80 can also be defined as a cloud-type computer memory that can be accessed remotely through various networks that include, but are not limited to, Wi-Fi, cellular, alternative wireless networks, combinations thereof, or other similar wired or wireless network.

Referring now to FIGS. 1-6, after at least some of the massage subroutines 62 have been created, a user can select a vehicle 14 to be occupied (step 408). Within the vehicle 14, the occupant may also select a particular seating position 18 within the vehicle 14 to be occupied. Accordingly, a particular ride-share program or a fleet vehicle program can include a selection within the computer program or application for selecting a particular seating position 18 within the vehicle 14 to be occupied. Once the vehicle 14 and/or seating position 18 is identified, the user can then apply at least one of the massage subroutines 62 to the various massage elements 16 disposed within the particular seating position 18 of the vehicle 14 to be occupied. Once the vehicle 14 to be occupied is selected, the user places the portable memory 80 in communication with the vehicle 14 to be occupied (step 410). It is contemplated that when the portable memory 80 is in communication with the vehicle 14 to be occupied, the plurality of massage subroutines 62 are in selective communication with the plurality of massage elements 16 of the vehicle seat 10. The user can then select a pattern of massage subroutines 82 to be performed (step 412). Accordingly, where the user desires a certain type of massage on a particular day, the user can bundle various massage subroutines 62 together to form a massage program, defined by the pattern of massage subroutines 82 to be performed during occupancy of the vehicle seat 10.

Referring now to FIGS. 1-9, it is contemplated that the selected pattern of massage subroutines 82 can be adapted to be compatible with the massage element configuration 30 of the vehicle seat 10 to be occupied (step 414). As discussed above, various vehicle seats 10 among vehicle types and also various seating positions 18 within the same vehicle 14 can include a wide range of massage element configurations 30. Accordingly, after the pattern of massage subroutines 82 has been selected, the massage subroutines 62, as they were created by the user, may or may not be directly compatible with the massage element configuration 30 of the particular seating position 18. It is contemplated that a processor 90 placed in communication with the user interface 40 and/or the portable memory 80 can perform an adaptive function 92 to modify the particular massage instructions 60, massage subroutines 62 and/or pattern of massage subroutines 82 to be performed as nearly as possible by the various massage elements 16 within the massage element configuration 30 of the vehicle seat 10 to be occupied.

By way of example, and not limitation, the user interface 40 of FIG. 3 illustrates two vertical columns of massage elements 16 that the user may engage to create the plurality of massage subroutines 62. As exemplified in FIGS. 7-9, the configuration of massage elements 16 in a particular vehicle 14 or a particular seating position 18 can deviate from this configuration exemplified within the user interface 40. The adaptive function 92 of the device defined within the processor 90 can evaluate each massage subroutine 62 within the selected plurality of subroutines and place each massage instruction 60 in communication with a particular massage element 16 or massage elements 16 for performance of that particular massage instruction 60. Accordingly, each massage instruction 60 of the plurality of massage subroutines 62 is assigned to one or more massage elements 16 for performance of the massage subroutines 62 as nearly as possible to the selected massage subroutines 62 as an adapted set of subroutines 94.

Figure 6:
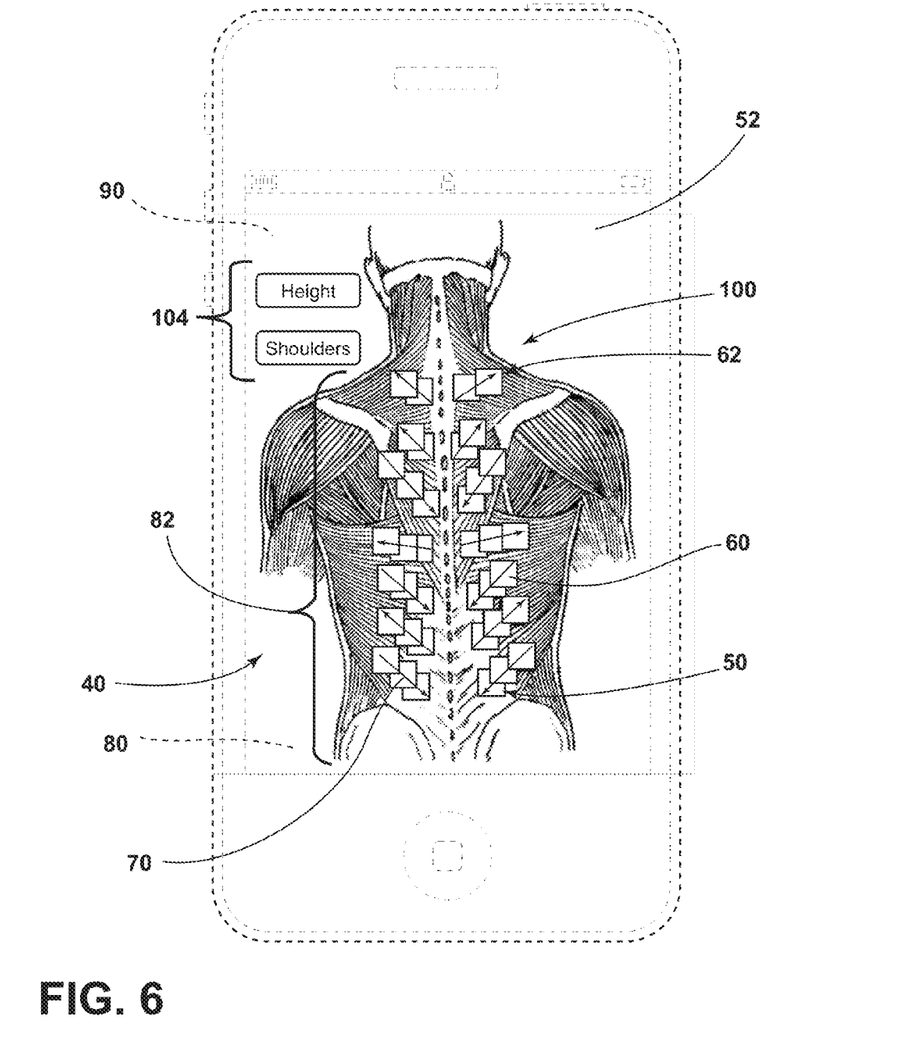
FIG. 6 is an elevational view of an alternate aspect of a user interface for operating a massage function of a vehicle seat.
Figure 7:
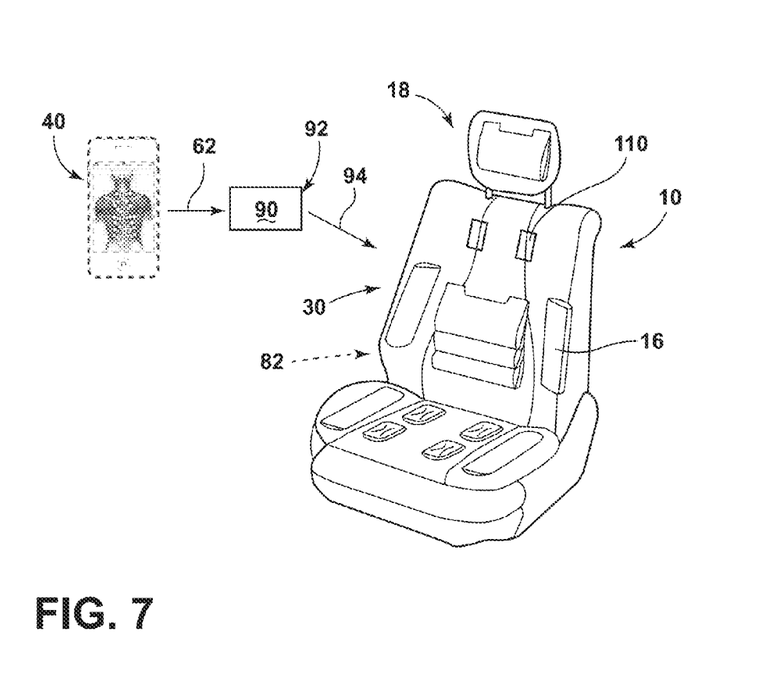
FIG. 7 is an exemplary perspective view illustrating locations of various massage elements within the vehicle seat.
Figure 8:
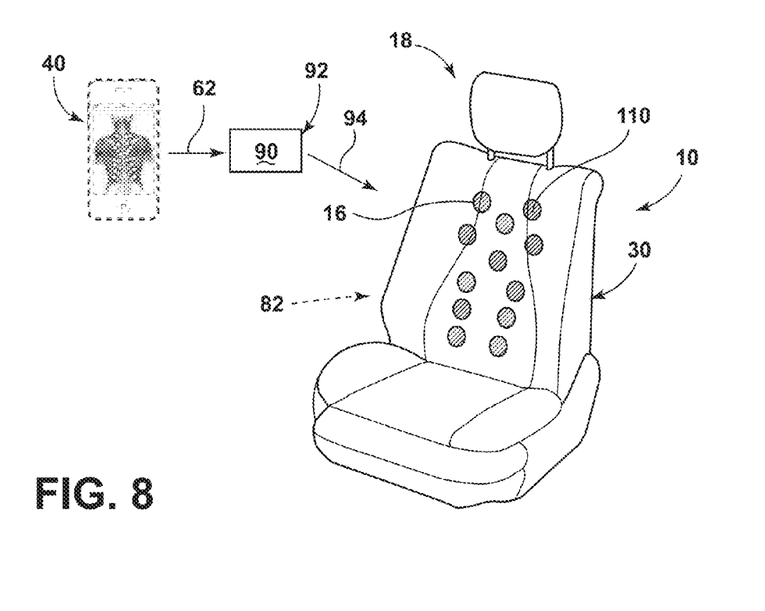
FIG. 8 is a perspective view of an exemplary vehicle seat incorporating a plurality of massage elements in a particular configuration.
Figure 9:
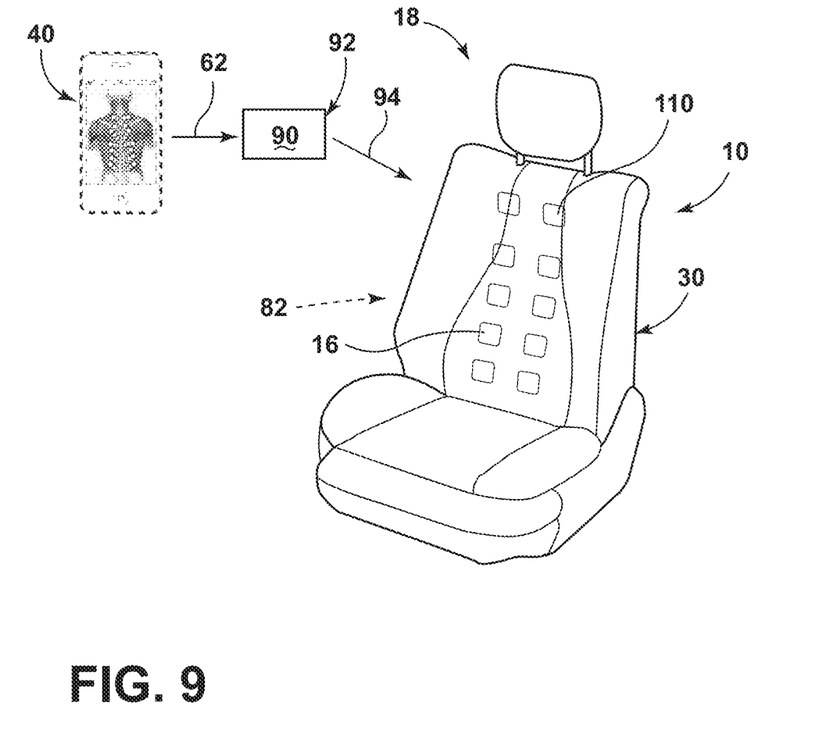
FIG. 9 is a perspective view of an exemplary vehicle seat illustrating a plurality of massage elements set within a predetermined configuration.
Figure 10:
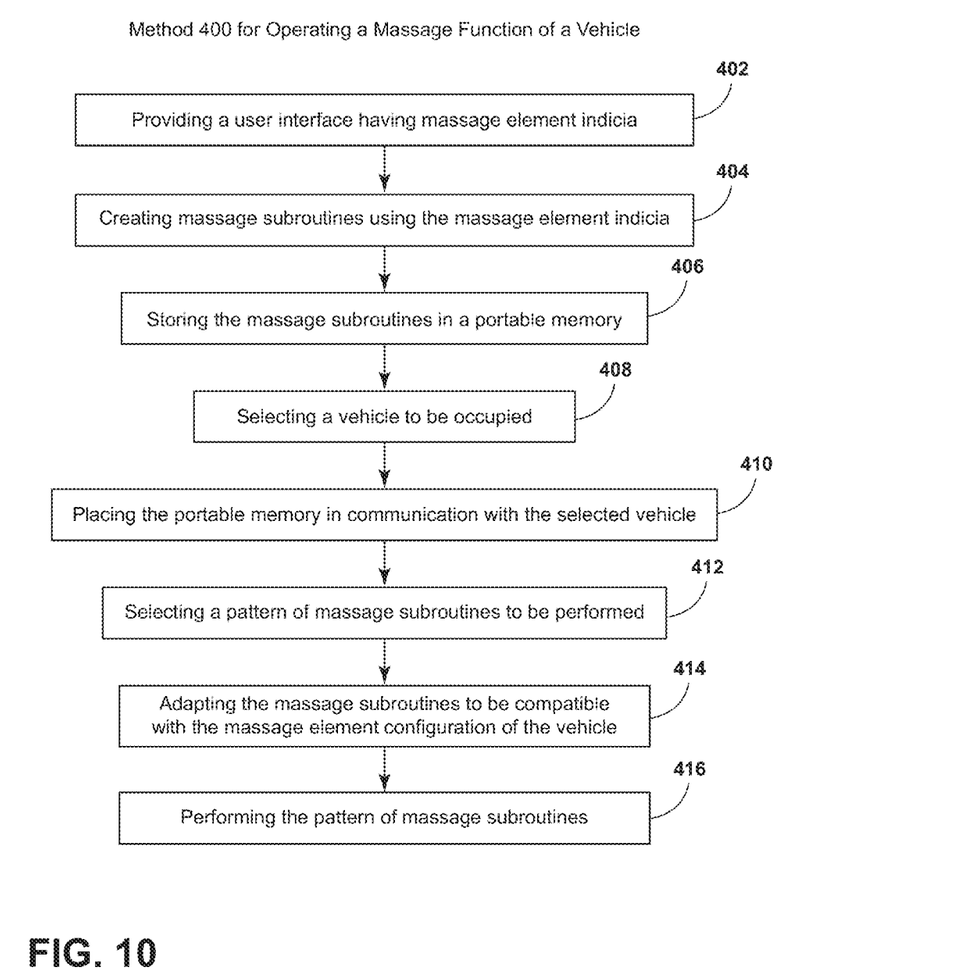
FIG. 10 is a schematic flow diagram illustrating a method for operating a massage function in a vehicle seat.

Referring now to FIG. 6, it is contemplated that instead of a user interface 40 incorporating an exemplary vehicle seat 10, the user interface 40 can exemplify a more anatomical representation of the human body for pointing to particular aspects of the human body to be massaged during occupancy of the vehicle seat 10. In this user interface 40, the user can engage various anatomical portions 100 of the user interface 40 that corresponds to portions of the user's back for defining the plurality of massage subroutines 62. The various massage subroutines 62 correspond to a series of massage instructions 60 that relate to the representation of the user's back within the user interface 40. In such an embodiment, it is contemplated that the adaptive manipulation of the various massage instructions 60 of the plurality of massage subroutines 62 will take place regardless of the massage element configuration 30 of the plurality of massage elements 16 disposed within the vehicle seat 10 to be occupied. It is also contemplated that various dimensional tolerances 104 can be entered into the user interface 40 such that manipulation of the user interface 40 corresponds to a particular portion of a user's body. The dimensional tolerances 104 can also provide instructions to the vehicle seat 10 to be occupied for adjusting the performance of the various massage functions to correspond to the size of the particular individual occupying the vehicle seat 10. By way of example, and not limitation, a person of lesser height occupying a particular vehicle seat 10 may have particular massage subroutines 62 that affect the upper portion of that particular user's back. Because of the lesser height of that particular individual, the upper-most massage elements 110 disposed within the vehicle seat 10 being occupied may be left inactive as they may not correspond or fit within the dimensional tolerances 104 of that particular individual. The dimensional tolerances 104 that can be conveyed through the use of the user interface 40 can include, but are not limited to, width, height, weight, injuries, ailments, amputations, combinations thereof, and other anthropomorphic physical characteristics of a particular individual. After the adaptive processes have been performed, the user can then activate a plurality of massage elements 16 to perform the pattern of massage subroutines 82 (step 416).

Referring again to FIGS. 1-9 and 11, a method 500 for operating the massage functions of a vehicle seat 10 can include a step 502 of engaging the user interface 40, where the user interface 40 includes the plurality of massage element indicia 50. Using a massage element indicia 50, the user can then select patterns of massage element indicia 50 from the plurality of massage element indicia 50 (step 504). In this manner, the selected patterns of massage element indicia 50 define a plurality of massage subroutines 62. Each pattern of massage element indicia 50 selected corresponds to a specific massage subroutine 62. As discussed above, each massage subroutine 62 includes one or more massage instructions 60 to be performed over the course of that particular massage subroutine 62. After the massage subroutines 62 are created, the plurality of massage subroutines 62 are stored within a portable memory 80 in communication with the user interface 40 (step 506). It is contemplated that the portable memory 80 can be one that is physically separated from the vehicle 14. It is also contemplated that the plurality of massage subroutines 62 can be stored within an internal memory of the vehicle 14, especially where a particular user may be occupying that vehicle 14 frequently, such as a regular ride-share customer, a frequently used fleet vehicle, or other similar instance of repeated occupancy of a particular vehicle seating position 18 within a particular vehicle 14.

Referring again to FIGS. 1-9 and 11, after the plurality of massage subroutines 62 are selected and stored, the user selects a vehicle 14 to be occupied (step 508). As discussed above, the vehicle 14 to be occupied includes a vehicle seat 10 having a plurality of massage elements 16 set within a particular massage element configuration 30. Each vehicle 14 can include a plurality of massage element configurations 30 that corresponds to respective seating positions 18 within the vehicle 14. In this manner, the massage element configuration 30 of the driver's seat 20 may be different than the massage element configuration 30 for the front passenger seat 22 of one of the rear seating positions 24. After the vehicle 14 to be occupied is selected, the portable memory 80 is placed in communication with the vehicle 14 to be occupied, such that each massage element indicia 50 of the plurality of massage element indicia 50 is adapted to correspond to a particular massage element 16 of the plurality of massage elements 16 disposed within the vehicle seat 10 to be occupied (step 510). After the portable memory 80 is placed in communication with the vehicle 14, a processor 90 in communication with the user interface 40 operates a massage element 16 verification to determine if the configuration of the plurality of massage element indicia 50 corresponds to the configuration of the plurality of massage elements 16 (step 512). As discussed above, the user interface 40 can include a representation of a vehicle seat 10, or representation of anatomical portions 100 of a user's back. These massage element indicia 50 may or may not correspond to the massage element configuration 30 within that particular seating position 18 of the vehicle 14. The massage element verification step 512 serves to verify whether these configurations do or do not match in order to determine whether any adjustment or adaptation of the massage subroutines 62 needs to be performed before the massage subroutines 62 can be properly performed as designed. If the configuration of the plurality of massage element indicia 50 does not correspond with the plurality of massage elements 16 within the vehicle seat 10, the plurality of massage element indicia 50 are adjusted. Accordingly, each massage instruction 60 within a particular massage subroutine 62 can be adapted to correspond to at least one massage element 16 of the massage element configuration 30 of the particular seating position 18 of the vehicle 14. In this manner, each massage element indicia 50 of the plurality of massage element indicia 50 is adjusted to correspond to at least one massage element 16 of the plurality of massage elements 16. In turn, each massage instruction 60 is performed, as accurately as possible, by one or more massage elements 16 disposed within the vehicle seat 10 (step 514).

Referring again to FIGS. 1-9 and 11, the user then selects a pattern of massage subroutines 82 from the plurality of massage subroutines 62 to be performed by the plurality of massage elements 16 (step 516). It is contemplated that the massage element verification step 512 and the adjusting step 514 can be performed either before or after the user selects the pattern of massage subroutines 62 to be performed by the plurality of massage elements 16.

Figure 11:
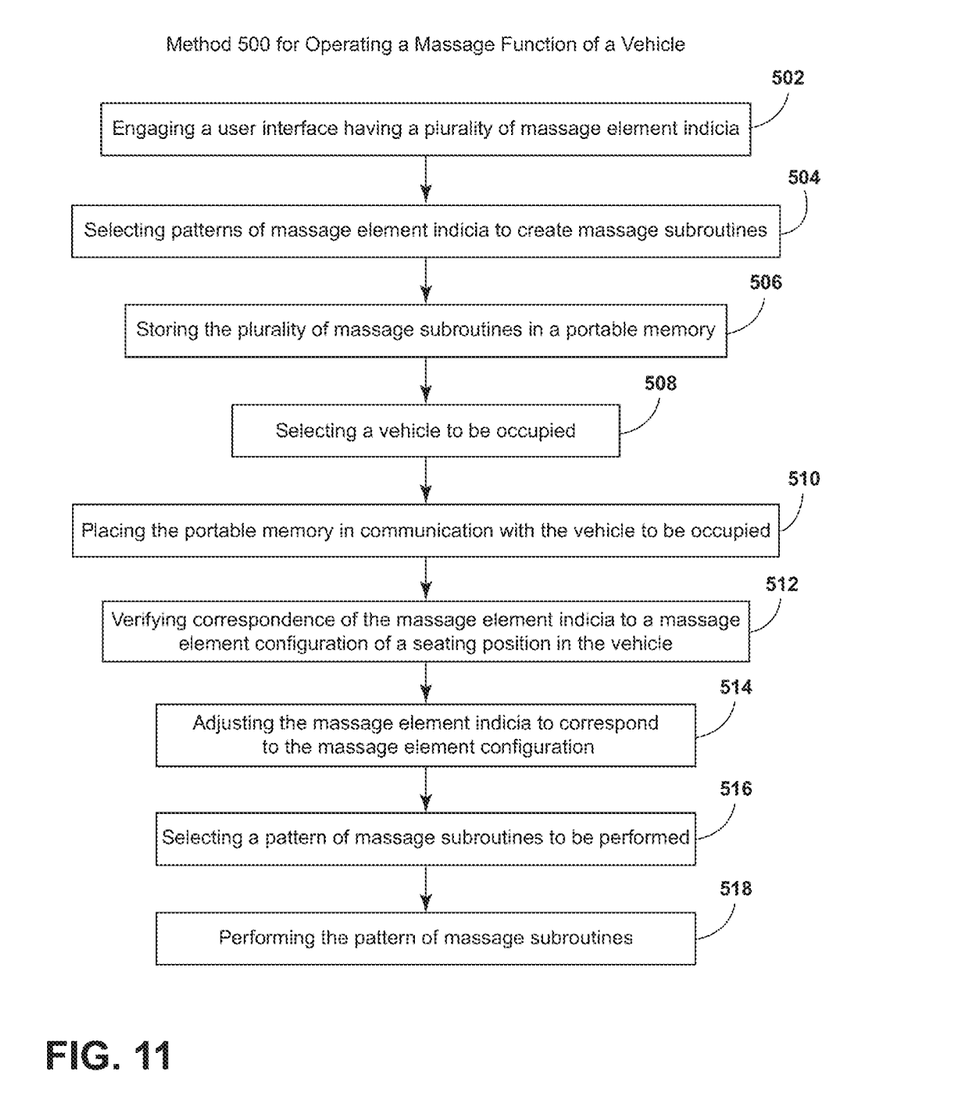
FIG. 11 is a schematic flow diagram illustrating a method for operating a massage function of a vehicle seat.
Figure 12:
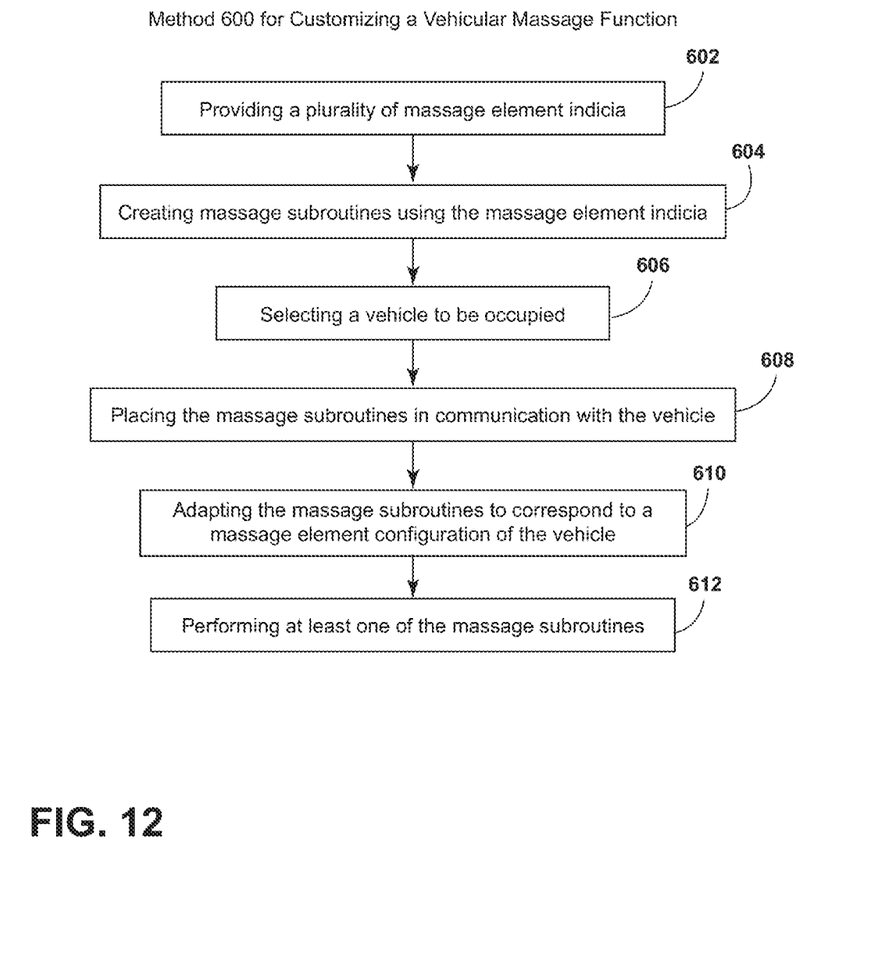
FIG. 12 is a schematic flow diagram illustrating a method for customizing a vehicular massage function within a vehicle seat to be occupied.

According to the various embodiments, the user can save various massage subroutines 62 that are configuration specific to correspond more appropriately to a particular vehicle type, such that less of a degree of adjustment is made during the adjusting step 514 of the method 500. It is contemplated that the user can categorize various massage subroutines 62 or copies 54 of massage subroutines 62 that match better with particular vehicles 14 and save a particular set of massage subroutines 62 that correspond to each vehicle 14 that may be occupied and/or each vehicle seating position 18 within the various vehicles 14 that are to be occupied. Additionally, after verification and adaption of the massage subroutines 62, the adjusted massage element indicia 50 can be used to create additional massage subroutines 62 that can immediately correspond to the particular massage element 16 configuration of the seating position 18 being occupied.

It is contemplated that the user may design or configure various massage subroutines 62 depending upon the seating position 18 they are going to be in. Additionally, the massage subroutines 62 can be configured to provide for various massage preferences of a particular user. Such preferences can be based upon the seating position 18, the stress-level of the user, the time of day, various ailments or health concerns of the user, combinations thereof and other similar considerations. By way of example, and not limitation, where a particular user is going to be driving, the massage subroutines 62 can be designed and/or selected to help the user stay awake, while a user that may be occupying the front passenger seat 22 or one of the rear seating positions 24 may design and/or select various massage subroutines 62 to provide a more relaxing massage that may help the user de-stress, relax and/or relieve various muscle issues that may be experienced by a user, such as during a long trip.

Referring again to FIGS. 1-9 and 11, after the pattern of massage subroutines 82 have been selected according to step 516, the plurality of massage elements 16 can be activated to perform the pattern of massage subroutines 82 (step 518).

Referring now to FIGS. 1-9 and 12, a method 600 can be implemented using the user interface 40 for customizing a vehicular massage function for a vehicle 14 to be occupied. According to the method 600, various massage element indicia 50 can be provided (step 602). Using the massage element indicia 50, the user can create various massage subroutines 62 to be performed (step 604). After creating the massage subroutines 62, or during creation of the massage subroutines 62, the user can select a vehicle 14 to be occupied (step 606). As discussed above, each vehicle 14 includes at least one vehicle seat 10 having a massage element configuration 30. Additionally, each seating position 18 within the passenger cabin 12 can have a position-specific massage element configuration 30. After the vehicle 14 is selected, the massage subroutines 62 are placed in communication with the vehicle 14 (step 608). This communication can be established through a processor 90 that links a portable memory 80 within which the massage subroutines 62 are stored with a portion of the vehicle 14, such that the massage subroutines 62 can be communicated to the vehicle 14 for performance, while the user is occupying the particular seating position 18. It is also contemplated that the various massage subroutines 62 can be uploaded to an internal memory of the vehicle 14. It is also contemplated that the massage subroutines 62 can be stored within a cloud-memory device such that the portable computing device having the user interface 40 as well as the vehicle 14 can each access any one or more of a plurality of massage subroutines 62. The various massage subroutines 62 can then be adapted to be compatible with the massage element configuration 30 of the particular seating position 18 (step 610). After the adaptive step 610 is completed, the vehicle seat 10 and the massage elements 16 within the vehicle seat 10 can be activated to perform the at least one massage subroutine 62 (step 612).

According to the various embodiments, the user interface 40 can be manipulated through a series of touches, swipes, gestures, hand movements, combinations thereof or other similar gesture or engaging movements that can be used to selectively engage portions of the user interface 40, including one or more of the massage element indicia 50 disposed within the user interface 40.

Through the use of the user interface 40 and the various methods described herein, a user of one or more fleet vehicle and/or ride share vehicles can develop a set of massage subroutines 62 where each of the massage subroutines 62 can combine with other massage subroutines 62 to develop various massage programs to be performed during occupancy of a vehicle 14. It is contemplated that the massage subroutines 62 can be adapted or adjusted to accommodate various massage element configurations 30 present within different vehicles 14 and also present within the same vehicle 14 among the various seating positions 18 of the passenger cabin 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for operating a massage function of a vehicle, the method comprising steps of:
providing a user interface having a plurality of massage element indicia;
creating a plurality of massage subroutines by selecting patterns of massage element indicia from the plurality of massage element indicia, wherein selection of each massage element indicia corresponds to a massage instruction for a specific massage subroutine;
storing the plurality of massage subroutines in a portable memory in communication with the user interface;
selecting a vehicle to be occupied, wherein the vehicle to be occupied includes a seat having a plurality of massage elements placed in a massage element configuration;
placing the portable memory in communication with the vehicle to be occupied wherein the plurality of massage subroutines are in selective communication with the plurality of massage elements;
selecting a pattern of massage subroutines of the plurality of massage subroutines to be performed;
adapting the pattern of massage subroutines to be compatible with the massage element configuration, wherein each massage instruction of each specific massage subroutine is placed in correspondence with at least one massage element of the plurality of massage elements; and
activating the plurality of massage elements to perform the pattern of massage subroutines.

2. The method of claim 1, wherein the massage element indicia corresponds to a representation of a user's back exemplified within the user interface, and wherein the massage subroutines correspond to performance of a series of massage instructions relating to the representation of the user's back.

3. The method of claim 1, wherein the vehicle to be occupied is any one of a plurality of vehicles, wherein each vehicle of the plurality of vehicles includes a plurality of seating positions each having the massage element configuration, and wherein the step of adapting the pattern of massage subroutines includes selecting the seating position to be occupied.

4. A method for operating a massage function of a vehicle, the method comprising steps of:
engaging a user interface having a plurality of massage element indicia;
selecting patterns of massage element indicia from the plurality of massage element indicia, to define a plurality of massage subroutines, wherein each pattern of massage element indicia corresponds to a specific massage subroutine;
storing the plurality of massage subroutines in a portable memory in communication with the user interface;
selecting a vehicle to be occupied, wherein the vehicle to be occupied includes a seat having a plurality of massage elements;
placing the portable memory in communication with the vehicle to be occupied such that each massage element indicia of the plurality of massage element indicia corresponds to a massage element of the plurality of massage elements;
selecting a pattern of massage subroutines of the plurality of subroutines to be performed by the plurality of massage elements; and
activating the plurality of massage elements to perform the pattern of massage subroutines.

5. The method of claim 4, wherein the step of selecting the vehicle to be occupied includes selecting the vehicle from a plurality of vehicles.

6. The method of claim 4, further comprising steps of:
operating a massage element verification to determine if a configuration of the plurality of massage element indicia corresponds to the configuration of the plurality of massage elements; and
adjusting at least one of the plurality of massage element indicia and the plurality of massage subroutines where the configuration of the plurality of massage element indicia does not correspond to the configuration of the plurality of massage elements such that each massage element indicia of the plurality of massage element indicia corresponds to at least one massage element of the plurality of massage elements.

7. The method of claim 5, wherein the plurality of vehicles include a plurality of massage element configurations, and wherein the plurality of massage subroutines includes configuration-specific massage subroutines that correspond to each massage element configuration of the plurality of vehicles.

8. The method of claim 7, wherein each vehicle has at least two separate massage element configurations corresponding to specific seating positions within the vehicle.

9. The method of claim 4, wherein the plurality of massage subroutines are also stored within an internal memory of the vehicle.

10. The method of claim 4, wherein the user interface is a touchscreen for a portable computing device.

11. The method of claim 5, wherein the plurality of vehicles are a set of fleet vehicles.

12. The method of claim 5, wherein the plurality of vehicles are ride-share vehicles.

13. The method of claim 4, wherein each massage element indicia includes a user interface for selecting at least one massage instruction of a plurality of massage instructions, and wherein the step of selecting patterns of massage element indicia includes selecting the at least one massage characteristic as to each massage element indicia.

14. The method of claim 13, wherein the massage characteristics include massage time, idle time, massage intensity and massage type.

15. A method for customizing a vehicular massage function comprising steps of:
providing massage element indicia;
creating massage subroutines using the massage element indicia;
selecting a vehicle that includes a seat having a massage element configuration;
placing the massage subroutines in communication with the vehicle;
adapting the massage subroutines to be compatible with the massage element configuration; and
activating the seat to perform at least one massage subroutine.

16. The method of claim 15, wherein the at least one massage subroutine includes a plurality of massage subroutines.

17. The method of claim 15, wherein the step of creating massage subroutines includes storing the massage subroutines in a portable memory physically separated from the vehicle.

18. The method of claim 15, wherein the vehicle is one of a plurality of vehicles.

19. The method of claim 15, wherein the massage element indicia corresponds to a representation of a user's back exemplified within a user interface, and wherein the massage subroutines correspond to performance of a series of massage instruction relating to the representation of the user's back.

20. The method of claim 19, wherein the step of adapting the massage subroutines includes selecting massage elements in the massage element configuration of the seat to perform the series of massage instructions relating to the representations of the user's back.

* * * * *